United States Patent [19]

Ulrich et al.

[11] Patent Number: 4,704,031
[45] Date of Patent: Nov. 3, 1987

[54] ROTATION RATE MEASURING DEVICE

[75] Inventors: Reinhard Ulrich, Buchholz; Wilfried Auch, Asperg, both of Fed. Rep. of Germany

[73] Assignee: Standard Elektrik Lorenz, Stuttgart, Fed. Rep. of Germany

[21] Appl. No.: 869,556

[22] Filed: Jun. 2, 1986

[30] Foreign Application Priority Data

Jun. 22, 1985 [DE] Fed. Rep. of Germany ....... 3522415

[51] Int. Cl.$^4$ .............................................. G01B 9/02
[52] U.S. Cl. .................................................. 356/350
[58] Field of Search .......................... 356/350; 372/94

[56] References Cited

U.S. PATENT DOCUMENTS 4,573,795 3/1986 Auch et al. .......................... 356/350
4,638,266 1/1987 Auch et al. ...................... 350/358 X Primary Examiner—Vincent P. McGraw
Attorney, Agent, or Firm—Christie, Parker & Hale

[57] ABSTRACT

A rotation rate measuring device is disclosed in which two beam portions travel around an optical-fiber coil (6) in opposite directions, and in which the Sagnac phase difference between the two beam portions after passage through the optical-fiber coil is evaluated. A beam splitter (2) divides a light beam into the two beam portions. Between this beam splitter and one end of the optical-fiber coil (6), an additional beam splitter (4) is inserted which is followed by a spatial filter (13) and a frequency shifter (5). Also provided are means which ensure that the two beam portions which travel around the optical-fiber coil in opposite directions pass through the spatial filter and the frequency shifter by the same path. A fully reciprocal arrangement is thus obtained.

7 Claims, 4 Drawing Figures

ROTATION RATE MEASURING DEVICE

The present invention relates to a rotation rate measuring device as set forth in the preamble of claim 1. Such a device is disclosed in U.S. application Ser. No. 417,510 filed on Sept. 13, 1982, now U.S. Pat. No. 4,573,795.

In the prior art device, the light beam is shifted in frequency. A suitable frequency shifter is a Bragg cell. As can be seen from U.S. application Ser. No. 669,489 filed Nov. 7, 1984, U.S. Pat. No. 4,638,266 a frequency shift of $\Delta f = f_1 - f_2$ can be produced in various ways. One possibility is to shift the frequency $f_0$ of the light beam in a first Bragg cell by $f_1$. In a second Bragg cell, the frequency is then shifted by $-f_2$. It is also possible to drive a Bragg cell at both $f_1$ and $f_2$. By suitable choice of the propagation direction of the acoustic waves in the Bragg cell, a light beam with the frequency $f_0 + f_1 - f_2$ is obtained. Similar remarks apply to other frequency shifters.

In the rotation rate measuring device, the arrangement of the optical components should be reciprocal, i.e., their action on the light beam should be the same all the way from the light source to the photodetector. Between the light source or the detector and the optical fiber, there are usually two optical beam splitters between which a spatial filter is inserted. The spatial filter is frequently implemented with a piece of single-mode optical fiber. Problems with respect to reciprocity are caused by the Bragg cell, which is located between a beam splitter and the coiled optical fiber. Reciprocity exists only if the positions of the light beams coupled into and out of the frequency shifter are exactly symmetrical with respect to the propagation direction of the acoustic wave in the Bragg cell. This requires that the coupling elements (lenses, ends of optical fibers) be arranged symmetrically. This can be achieved during manufacture only with considerable effort. Even if symmetry has been achieved during manufacture, it may be lost during operation because of, e.g., mechanical influences or temperature variations.

The object of the invention is to provide a solution in which the errors caused by the absence of complete reciprocity are eliminated.

This object is attained by the means set forth in claim 1. Further advantageous aspects of the invention are claimed in the subclaims.

In the novel device, errors caused by the nonreciprocity of the coupling of the light beam into and out of the frequency shifter are compensated for, so that high measurement accuracy is achieved.

The invention will now be explained by way of example with reference to the accompanying drawings, in which.

Figure 2:
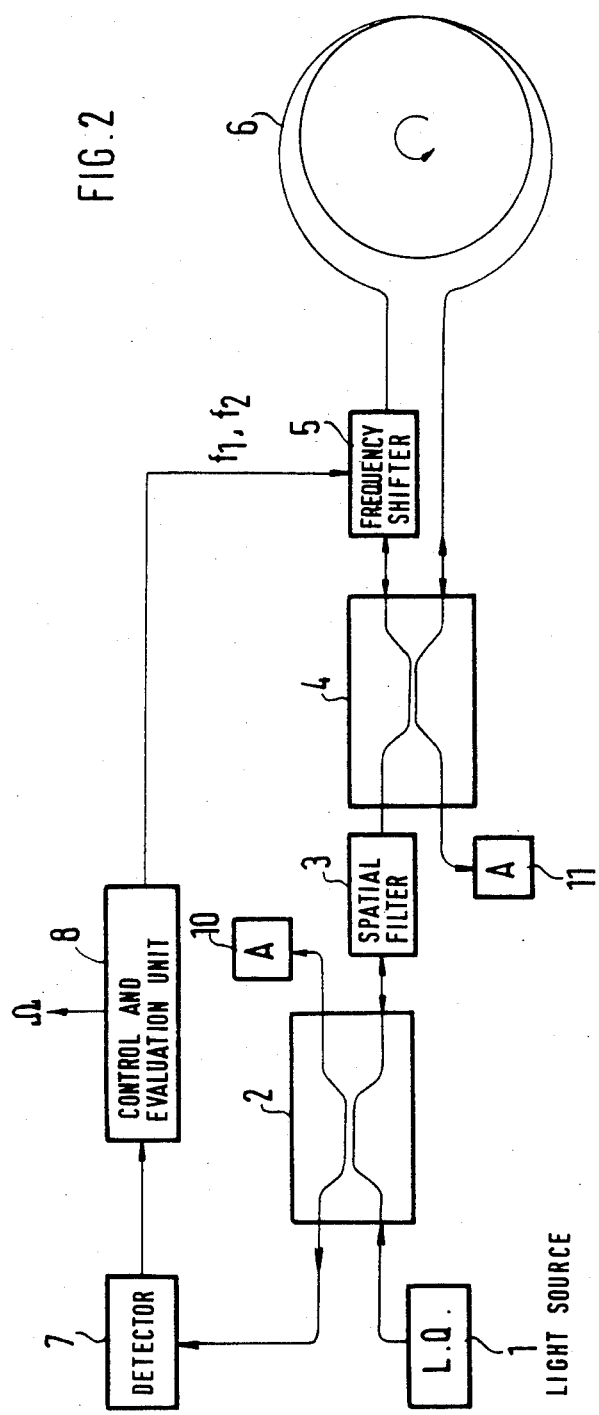
FIG. 2 is a block diagram of a prior art rotation rate measuring device.

First, the prior art rotation rate measuring device will be explained with the aid of FIG. 2. A light beam is generated in a light source 1, preferable a laser. It passes through a first beam splitter 2 and a spatial filter 3 to a second beam splitter 4. In the first beam splitter, the light beam generated by the laser 1 is split into two beam portions. One of the beam portions is directed to the spatial filter 3. The other beam portion reaches an absorber 10 and need not be considered in the following. The beam splitter 4 splits the light beam from the spatial filter 3 into two further beam portions. These two beam portions are coupled into a coiled optical fiber 6. A frequency shifter 5 is inserted in the light path between one of the outputs of the beam splitter 4 and one of the ends of the optical fiber 6. A suitable frequency shifter is a Bragg cell. The two beam portions emerging from the beam splitter 4 pass through the optical fiber 6 in opposite directions and return to the beam splitter 4, where they are now combined. A portion of the light beam produced by the combination is passed to the spatial filter 3. The other portion reaches an absorber 11. The beam portion emerging from the spatial filter 3 reaches the first beam splitter 2, which passes it to a detector 7. The electric output signal of the detector 7 is fed to a control and evaluation unit 8. In the latter, the rotation rate is determined from the Sagnac phase difference that exists between the two beam portions after passage through the coiled optical fiber 6. The control and evaluation unit 8 also produces the drive signal for the frequency shifter. Details of the evaluation will not be explained here because they are disclosed in DE-OS No. 31 36 688.

As mentioned above, a desired frequency shift can be produced with two Bragg cells in tandem which are driven at the frequencies $f_1$ and $f_2$. It is also possible to provide only one Bragg cell which is driven with signals of the frequencies $f_1$ and $f_2$ simultaneously. Both solutions are described in DE-OS No. 33 40 809.

It has turned out that this arrangement is highly susceptible as far as the arrangement of the Bragg cell and of the means for coupling the light beam into and out of the Bragg cell is concerned. On the one hand, it is difficult to properly adjust these coupling means during manufacture. On the other hand, pressure or temperature variations, for example, cause departures from the required symmetry.

Figure 1:
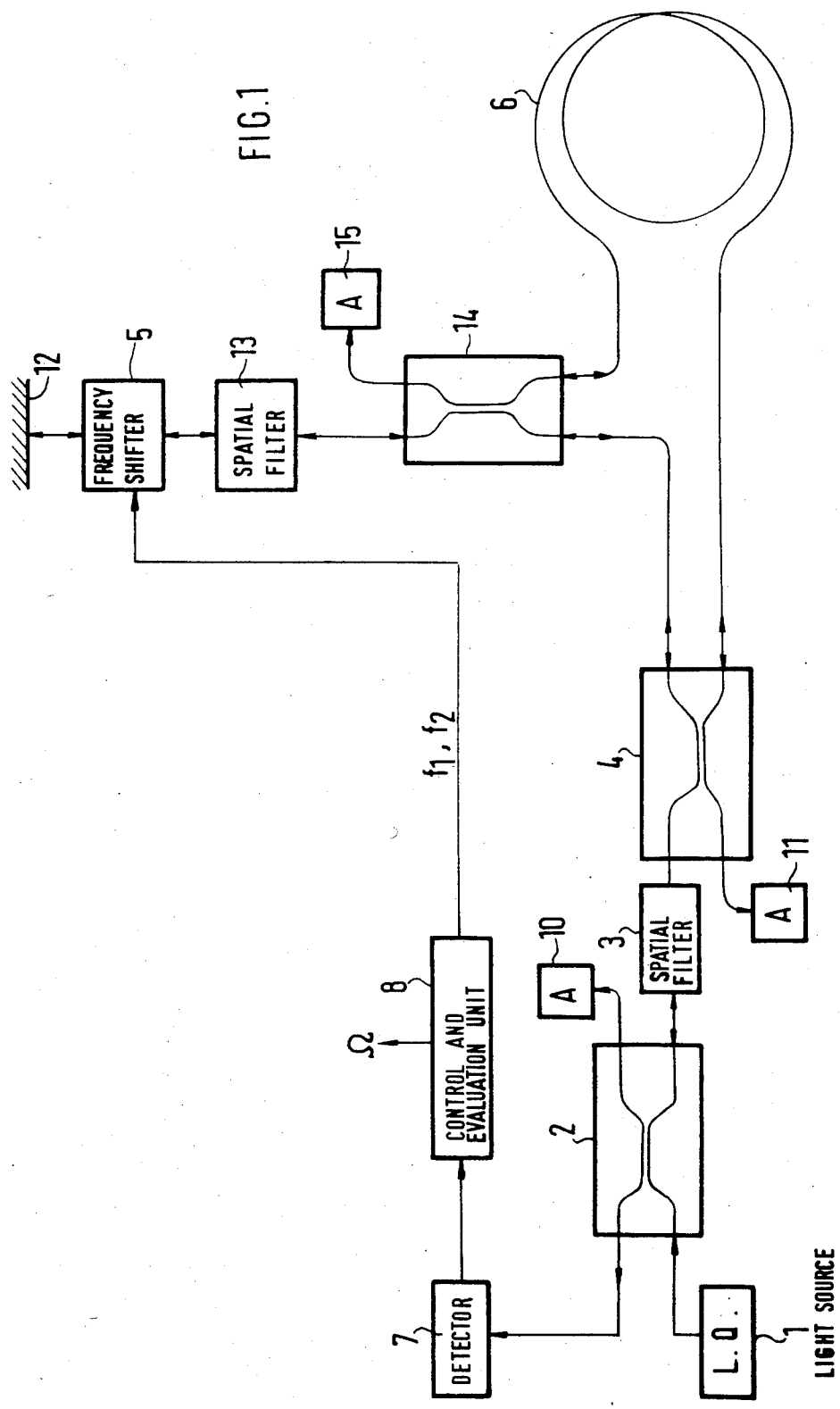
FIG. 1 is a block diagram of the novel rotation rate measuring device.

FIG. 1 shows the novel rotation rate measuring device which does not have these disadvantages. The arrangement of FIG. 1 is identical with that of FIG. 2 up to the second beam splitter 4 and the control and evaluation unit 8. Like components are designated by like reference characters. A coiled optical fiber 6 is present in this arrangement, too. In the novel arrangement, the beam portion emerging from the second beam splitter 4, instead of being passed to the frequency shifter 5 direct (FIG. 2), is first directed to an additional beam splitter 14. This beam splitter 14 divides this beam portion into two further portions. One of them reaches an absorber 15 and can be left out of consideration. The other passes through a spatial filter 13 to the frequency shifter 5. The frequency shifter 5 is of the same design as the frequency shifter 5 in the arrangement of FIG. 2. It is controlled by the evaulation and control unit 8 with two signals of the frequencies $f_1$ and $f_2$. Afer the frequency shift in the frequency shifter 5, the light beam is directed to a mirror 12 by an imaging lens (not shown). It is reflected at the mirror 12 and passes through the frequency shifter 5 a second time by the same path in the opposite direction. The beam then passes through the spatial filter 13 to the third beam splitter 14, which couples it into one end of the optical fiber 6. In this arrangement, too, errors may be caused in the frequency shifter 5 by the symmetry of the coupling means, but such errors are compensated for as the beam passes through the frequency shifter 5 and the spatial filter 13 twice, once in the forward direction and once in the reverse direction. It is particularly important that the two beam portions which travel around the coiled optical fiber in opposite directions reach and pass through the frequency shifter and the spatial filter by exactly the same path. As a result, both adjustment errors during the manufacture of the device and departures from symmetry during operation are not detrimental.

Instead of imaging the light beam emerging from the frequency shifter 5 on a mirror 12, the acousto-optical medium of the Bragg cell can be terminated on the light output side with a reflection coating. In this arrangement, it is necessary for the sound wave to propagate parallel to the plane of this reflection coating. This is achieved in practice by attaching the acousto-optical cell to a side surface which makes a right angle with the mirror plane. Because of the specular reflection, the region of interaction with the acoustic wave needs to be only half as long as in a conventional transmission Bragg cell. The frequency shift is equal to the frequency at which the Bragg cell is driven.

Further arrangements without a mirror will now be explained with the aid of FIGS. 3 and 4. Solutions in which no separate mirror is necessary are especially suited for implementation using integrated optical circuits.

Figure 3:
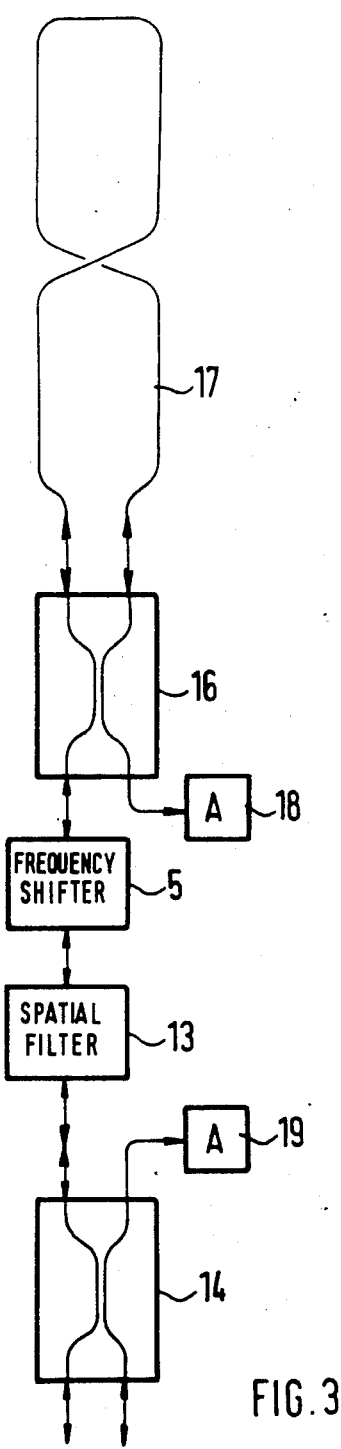
FIGS. 3 and 4 show two different positions of the frequency shifter for the novel rotation rate measuring device.

In the arrangement of FIG. 3, like in the arrangement of FIG. 1, the third beam splitter 14 is followed by the spatial filter 13 and the frequency shifter 5. However, the light beam emerging from the frequency shifter 5, instead of being directed onto a mirror, is passed to a fourth beam splitter 16. The output light beam of the fourth beam splitter 16 passes through a light path 17. After passage through this light path, it enters the beam splitter 16 again. The two ends of the light path 17 are connected to different inputs/outputs of the beam splitter 16. The remaining fourth input/output of the beam splitter 16 is connected to an absorber 18. The light path is arranged to have approximately the shape of the numeral 8. The two areas enclosed by the light path are thus traversed in opposite directions. Via that input-/output of the fourth beam splitter 16 through which the light beam from the frequency shifter 5 entered the fourth beam splitter, the light beam enters the frequency shifter again after passage through the light path 17 and passes through this frequency shifter by the same path as was the case for the light beam directed from the spatial filter 13 to the frequency shifter.

Figure 4:
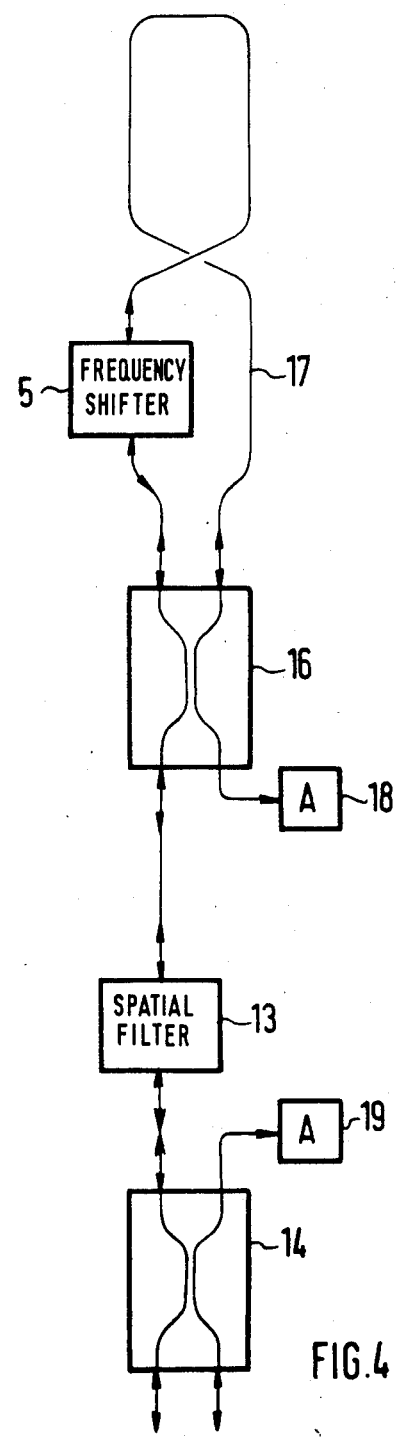

The arrangement of FIG. 4 differs from that of FIG. 3 in that the frequency shifter is not disposed between the spatial filter 13 and the fourth beam splitter 16 but is included in the light path 17.

In the arrangements, arrows indicating the directions of the light beams are frequently drawn in both directions, because the light beams propagate in both directions. In the arrangement of FIG. 1, for example, the beam portion emerging from the second beam splitter 4 passes through the third beam splitter 14 and the spatial filter 13 to the frequency shifter 5. After passing through the frequency shifter 5, it is reflected at the mirror 12 and returns through the frequency shifter 5 and the spatial filter 13 to the beam splitter 14, which couples it into the optical fiber 5. The other beam portion emerging from the second beam splitter 4 traverses the optical fiber 6 in the opposite direction and passes through the second beam splitter 14 and the spatial filter 13 to the frequency shifter 5. Like the other beam portion, it is reflected at the mirror 12 and returns to the third beam splitter 14. The third beam splitter 14 passes this beam portion to the second beam splitter 4.

The beam splitters are preferably designed as optical directional couplers.

We claim:

1. Rotation rate measuring device comprising a light source (1) generating a light beam, wherein said light beam is passed through a first beam splitter (2) to a second beam splitter (4) for splitting the light beam into two beam portions which travel in opposite directions over a light path (6) enclosing an area, wherein, after passage through the light path, the two beam portions are combined in the second beam splitter, wherein at least a portion of the light beam produced by the combination passes from the second beam splitter to a detector (7) whose output is evaluated in a control and evaluation unit (8), wherein at least one of the beam portions is frequency-shifted in a frequency shifter (5) before being coupled into the light path, and wherein the rotation rate is determined in the control and evaluation unit from the Sagnac phase difference between the two beam portions after passage through the light path, characterized in that a third beam splitter (14) is inserted between the second beam splitter (4) and one end of the light path, that the frequency shifter (5) follows the third beam splitter (14), that a spatial filter (13) is inserted between the third beam splitter (14) and the frequency shifter (5), and that means (12) are provided which ensure that the two beam portions travelling over the light path (6) in opposite directions pass through the spatial filter and the frequency shifter by the same path.

2. A rotation rate measuring device as claimed in claim 1, characterized in that the means are a mirror (12) which reflects the light beam emerging from the frequency shifter back to the frequency shifter.

3. A rotation rate measuring device as claimed in claim 2, characterized in that the mirror is disposed directly on the frequency shifter.

4. A rotation rate measuring device as claimed in claim 1, characterized in that the means consist of a fourth beam splitter and an additional light path which encloses two areas and has approximately the shape of the numeral 8.

5. A rotation rate measuring device as claimed in claim 4, characterized in that the fourth beam splitter (16) and the additional light path (17) follow the frequency shifter.

6. A rotation rate measuring device as claimed in claim 4, characterized in that the fourth beam splitter (16) follows the third beam splitter (14), and that the frequency shifter (5) is inserted in the additional light path (17).

7. A rotation rate measuring device as claimed in claim 1, characterized in that an optical spatial filter (3) is inserted between the first beam splitter (2) and the second beam splitter (4).

* * * * *

UNITED STATES PATENT AND TRADEMARK OFFICE
CERTIFICATE OF CORRECTION

PATENT NO. : 4,704,031
DATED : November 3, 1987
INVENTOR(S) : Ulrich et al.

It is certified that error appears in the above-identified patent and that said Letters Patent is hereby corrected as shown below:

Column 2 Line 58  Change "Afer" to -- After --

Column 2 Line 67  Change "symmetry" to -- asymmetry --

Signed and Sealed this

Ninth Day of August, 1988

Attest:

DONALD J. QUIGG

*Attesting Officer*       *Commissioner of Patents and Trademarks*